United States Patent [19]

Taniguchi et al.

[11] Patent Number: 5,093,816
[45] Date of Patent: Mar. 3, 1992

[54] OPTICAL MAGNETIC RECORDING AND REPRODUCING SYSTEM

[75] Inventors: Shoji Taniguchi, Saitama, Japan; Naoharu Yanagawa, Saitama-Ken, both of Japan

[73] Assignee: Pioneer Electric Corporation, Tokyo, Japan

[21] Appl. No.: 606,282

[22] Filed: Oct. 31, 1990

[30] Foreign Application Priority Data

Mar. 8, 1990 [JP]  Japan .................................. 2-57586

[51] Int. Cl.$^5$ .................... G11B 13/04; G11B 11/12; G11B 11/10
[52] U.S. Cl. .................... 369/13; 360/114; 360/66
[58] Field of Search .................. 369/13, 14; 360/59, 360/114, 66; 365/122

[56] References Cited

U.S. PATENT DOCUMENTS 4,672,594  6/1987  Kato et al. .................... 360/114
4,787,002  11/1988  Isozaki ...................... 360/66

FOREIGN PATENT DOCUMENTS 62-62453   3/1987  Japan .
62-285261  12/1987 Japan .
63-214903  9/1988  Japan .
2-053201   2/1990  Japan .

*Primary Examiner*—Stuart S. Levy
*Assistant Examiner*—Hoa T. Nguyen
*Attorney, Agent, or Firm*—Armstrong, Nikaido, Marmelstein, Kubovcik & Murray

[57] ABSTRACT

An optical magnetic recording system has a magnetic head for generating a magnetic field on a magneto-optical disk, and an optical head including a magnetic actuator is provided for irradiating a laser beam. A field cancellation magnet is attached to the back of the magnetic head for producing a magnetic force so as to cancel a leakage magnetic force of the magnetic actuator which affects recording of information. This positioning of the field cancellation magnet provides better compensation of the leakage field without affecting the modulating field of the magnetic head.

3 Claims, 5 Drawing Sheets

OPTICAL MAGNETIC RECORDING AND REPRODUCING SYSTEM

BACKGROUND OF THE INVENTION

The present invention relates to an optical magnetic recording and reproducing system capable of recording information on a magneto-optical disk at high density.

In order to record information in the optical magnetic memory system, a laser beam is focused on the magneto-optical disk to elevate the temperature of a point to be recorded. On the other hand, the disk is magnetized, thereby rendering the direction of the magnetic moment in a magnetic domain of the disk upward or downward. Thus, the information is represented by one or zero digital signals.

FIG. 5 shows an example of a conventional optical magnetic recording and reproducing system employing the magnetic field modulation system. In order to record information on a magneto-optical disk 1, a laser beam from a laser device L is focused on a recording surface of the disk 1 through an objective lens 2. The beam reflected from the disk 1 is supplied to a focus error detector 4 through a beam splitter 3. The focus error detector 4 detects the focus error in accordance with the reflected beam, and applies a focus error signal to a focus servo 5. The focus servo 5 in turn applies a focus servo signal corresponding to the focus error signal to a driver 6. The driver 6 applies an exciting current in response to the servo signal to an actuator coil 7. The actuator coil 7 accordingly generates a magnetic field. The actuator coil 7 and hence the objective lens 2 are moved along the optical axis of the objective lens 2 due to a magnetic force of an actuator magnet 8.

When the laser beam is thus correctly focused on the recording surface of the disk 1, the temperature of the recording point thereon rises. At the same time, a signal current is applied to an excitation coil 11 which is wound around a core 10 mounted on a fixed magnetic head 9, rendering the direction of the magnetic moment in a magnetic domain of a ferro magnetic material formed on the recording surface of the disk upward or downward. Thus, information represented by one or zero digital signals is stored.

When reproducing the recorded information, a lighter laser beam correctly focused through the focus servo system is emitted. The beam is reflected on the disk 1, and the direction of the polarization plane of the reflected beam is different in dependency on the direction of the magnetic domain, so that whether the reflected beam is one or zero can be determined. Hence, the information is reproduced as shown by a waveform shown in FIG. 6.

FIG. 7 shows another conventional optical magnetic recording and reproducing system provided with a movable magnetic head 9. The magnetic head 9 is provided with an actuator coil 13 which generates a magnetic field in accordance with a servo signal from a magnetic head driver 12, and an actuator magnet 14.

The recording and reproducing system is constructed to move the magnetic head 9 to maintain the distance between the disk 1 and the magnetic head 9 constant in spite of the vibration or warp of the disk 1. Thus, the intensity of the magnetic field caused by the magnetic head 9 is kept constant, thereby reproducing information as shown by a waveform in FIG. 8.

However, in the above described magnetic field modulation method, a resultant magnetic field is generated due to a leakage of magnetic force from the actuator coils 7 and 13 and actuator magnets 8 and 14. The resultant magnetic field affects the recording of the information, so that the magnetic field for recording the information is distorted.

Comparing the FIGS. 6 and 8, the magnitude of the distortion in the system having the fixed magnetic head is larger than that having the movable magnetic head. This is caused by the fact that in the system with the fixed head, the distance between the disk 1 and the magnetic head 9 fluctuates when the disk 1 vibrates, so that the magnetic field for recording the information also fluctuates. Consequently, when the magnetic field for recording the information is distorted, the information can not be accurately recorded or reproduced, thereby decreasing the reliability of the system.

SUMMARY OF THE INVENTION

The object of the present invention is to provide an optical magnetic recording and reproducing system wherein information may be reliably recorded and reproduced.

According to the present invention, there is provided an optical magnetic recording and reproducing system having a magnetic head for generating a magnetic field on a magneto-optical disk, an optical head provided for irradiating a laser beam, a magnetic device for axially moving the optical head for focusing the laser beam on the magneto-optical disk, and a control unit for controlling the magnetic device for the focusing. Magnetic means is provided for producing a cancelling magnetic force so as to cancel a component included in a leakage magnetic force which affects recording of information.

In an aspect of the invention, the magnetic means is a magnet attached to the magnetic head.

The other objects and features of this invention will become understood from the following description with reference to the accompanying drawings.

DETAILED DESCRIPTION OF THE PREFERRED EMBODIMENTS

Figure 1:
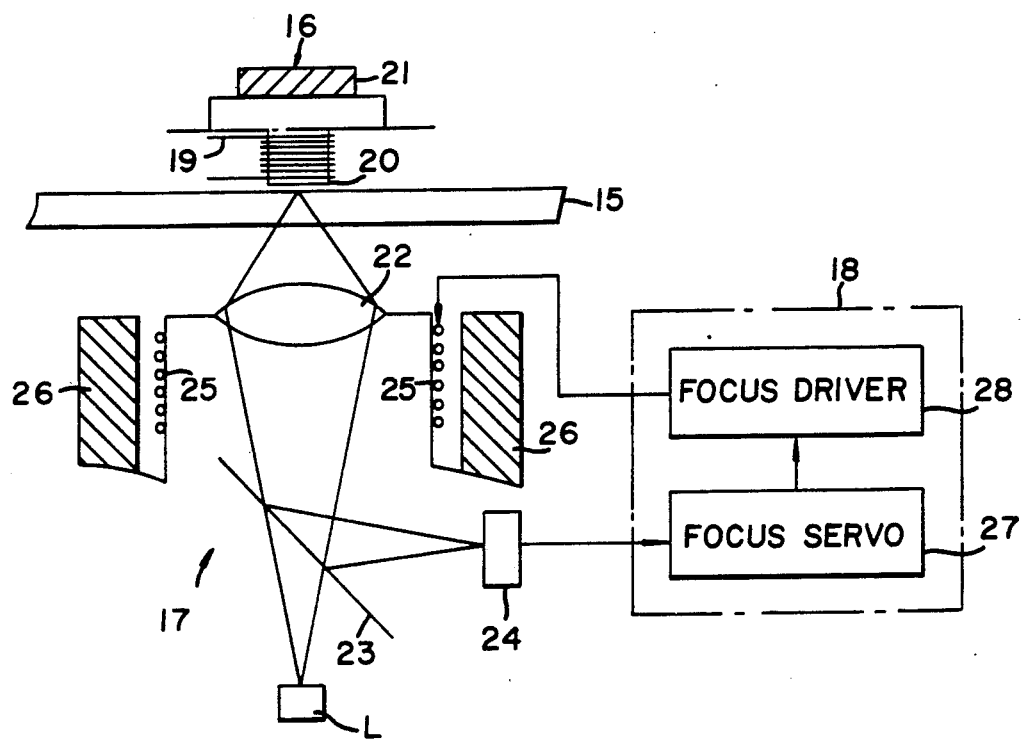
FIG. 1 is a schematic diagram of an optical magnetic recording and reproducing system according to the present invention.

Referring to FIG. 1, an optical magnetic recording and reproducing system of the present invention comprises a fixed magnetic head 16 which generates a magnetic field on a magneto-optical disk 15 in response to an electric signal applied thereto, an optical head 17 for irradiating a laser beam and detecting the reflection thereof, and a control unit 18 for controlling a focus servo system of the optical head 17.

The magnetic head 16 has a core 20 wound with an excitation coil 19 to which is applied a signal current. A resultant magnetic field which is harmful to the recording of information on the disk 15 is formed by a leakage of magnetic force from the optical head 17. The resultant magnetic field has a vertical component relative to a recording surface of the disk 15. Since the direction of the vertical component is specified, a bias magnet 21 is mounted on the magnetic head 16 so as to cancel the vertical component.

Namely, the bias magnet 21 is disposed so as to orient the lines of magnetic force thereof to oppose the vertical component. The intensity of the magnetic field of the magnet 21 is set to coincide with the intensity of the vertical component.

The optical head 17 comprises an objective lens 22 for focusing the laser beam emitted from a semiconductor laser, a beam splitter 23 for changing the direction of the beam reflected on the disk 15, and a focus error detector 24. The focus error detector 24 is applied with the reflected beam through the beam splitter 23 and detects a focus error using astigmatism and produces an error signal which is fed to the control unit 18.

The optical head 17 is further provided with an actuating coil 25 integral with the objective lens 22 and an actuator magnet 26. When an exciting current from the control unit 18 is applied, the actuator coil 25 is excited, thereby generating a magnetic field. A magnetic field of the actuator magnet 26 has a direction opposite to that generated by the actuator coil 25. Thus, the lens 22 is moved toward or away from the disk 15.

The control unit 18 has a focus servo 27 which produces a focus servo signal in response to the error signal from the focus error detector 24. The focus servo signal is fed to a focus driver 28 which in turn feeds the exciting current corresponding to the detected focus error to the actuator coil 25.

The operation of the optical magnetic recording and reproducing system is described hereinafter.

In order to record information, the laser beam is focused on a recording surface of the disk 15 through the objective lens 22. The beam reflected from the disk 15 is supplied to the focus error detector 24 through the beam splitter 23. The focus error detector 24 detects the focus error using astigmatism in accordance with the reflected beam applied thereto, and applies the focus error signal to the focus servo 27 of the control unit 18. The focus servo 27 in turn applies the focus servo signal corresponding to the focus error signal to the driver 28. The driver 28 applies the exciting current to the actuator coil 25 in response to the servo signal.

The actuator coil 25 accordingly generates the magnetic field in dependency on the exciting current. The coil 25 and hence the objective lens 22 are moved along the optical axis of the objective lens 22 due to the repulsion force of the magnetic field generated by the coil 25 against the magnetic field of the actuator magnet 26.

More particularly, the objective lens 22 is ordinarily positioned so that the focus is deflected from the desired position. In order to correct the focus, the level of the focus servo signal becomes higher so that the exciting current applied to the coil 25 is increased. As the intensity of the magnetic field of the coil 25 increases with an increase of the exciting current, the repulsion force between the actuator magnet 26 and the actuator coil 25 is increased so that the objective lens 22 moves toward the disk 15. When the exciting current is reduced thereafter, the repulsion force of the magnet 26 decreases, thereby moving the objective lens 22 away from the disk 15.

When the laser beam is thus correctly focused on the recording surface of the disk 15, the temperature of the recording point thereon rises. At the same time, the signal current is applied to the excitation coil 19 of the magnetic head 17, rendering the direction of the magnetic moment in a magnetic domain of a ferromagnetic material formed on the recording surface of the disk 15 upward or downward. Thus, information represented by one or zero digital signals is stored.

Meanwhile, a magnetic field, which is hazardous to the recording of the information is caused by the leakage of the magnetic force from the actuator coil 25 and the actuator 26 The component of the magnetic field which is vertical to the recording surface of the disk 15 is cancelled by the bias magnet 21. Namely, the line of the magnetic force of the actuator coil 25 and the actuator magnet 26 is directed in a certain direction in relation to the recording surface. Thus, only the vertical component need be cancelled to invalidate the magnetic field. Hence the line of magnetic force of the bias magnet 21 has a direction perpendicular to the disc 15 which is opposite to that of the vertical component, thereby cancelling it.

Figure 2:
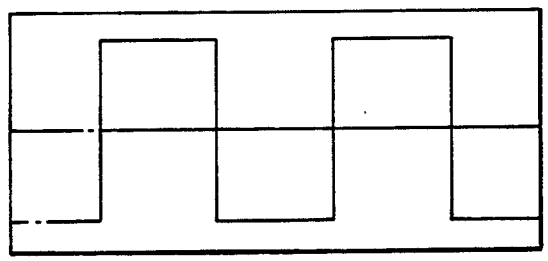
FIG. 2 is a graph showing a reproduction waveform generated by the system shown in FIG. 1.

When reproducing the recorded information, a lighter beam is emitted. The beam reflected on the surface of the disk has a different polarization plane in dependency on the direction of the magnetic domain. Thus, the reflected beam can indicate whether the information is one or zero. Hence, the information can be accurately reproduced without any distortion as shown by a reproduction waveform shown in FIG. 2.

The information can be rewritten on the disk 15 in the same manner as described hereinbefore.

Figure 3:
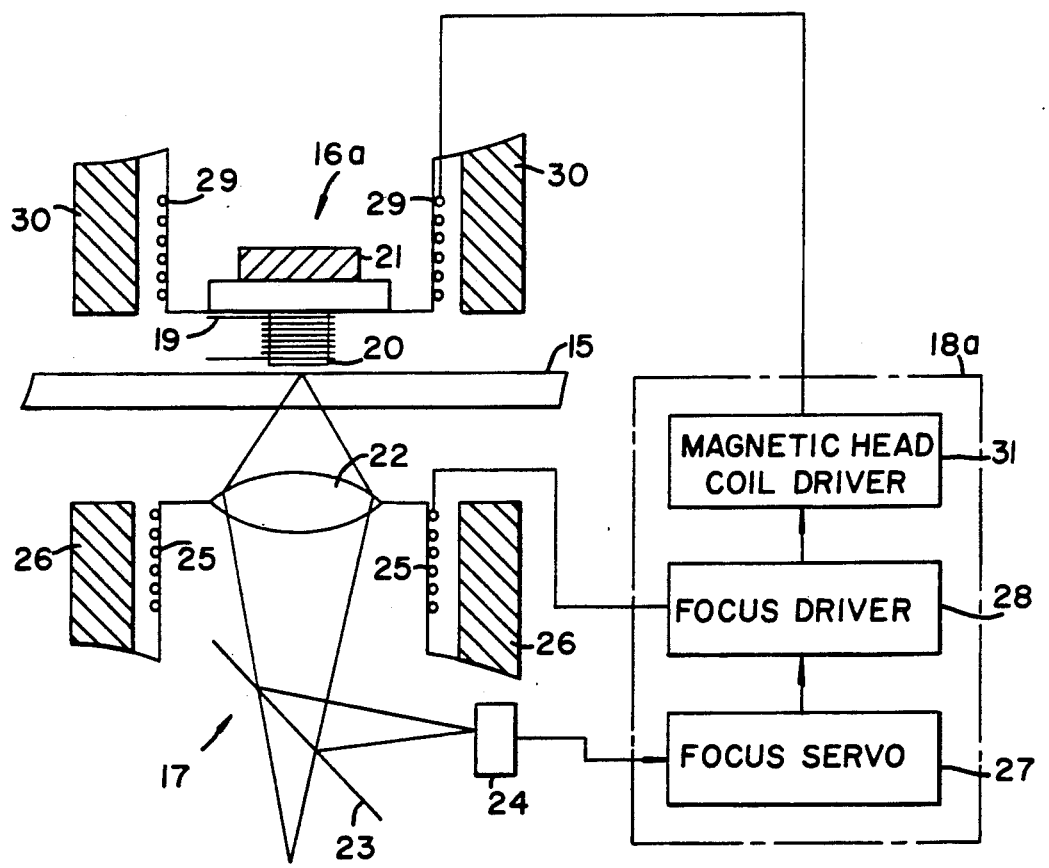
FIG. 3 is a schematic diagram of a second embodiment of the optical magnetic recording and reproducing systems of the present invention.

The second embodiment of the present invention shown in FIG. 3 is provided with a movable magnetic head 16a. The same numerals as those in FIG. 1 designate the same parts in FIG. 3 as FIG. 1 so that the description thereof are omitted. In addition to the coil 20 having the excitation coil 19 and the bias magnet 21, the magnetic head 16a is further provided with an actuator coil 29 and an actuator magnet 30. A control unit 18a has a magnetic head driver 31 which feeds an exciting current to the actuator coil 29 in response to the servo signal, in addition to the focus servo 27 and the driver 28 for actuating the actuator coil 25.

The system of the second embodiment is constructed to maintain the distance between the disk 15 and the magnetic head 16a constant in spite of the vibration or warp of the disk 15. Thus, the magnetic field caused by the magnetic head 16a acting on the disk 15 is kept constant so that the recording and reproduction of information becomes more accurate compared to the system of the first embodiment.

Figure 4:
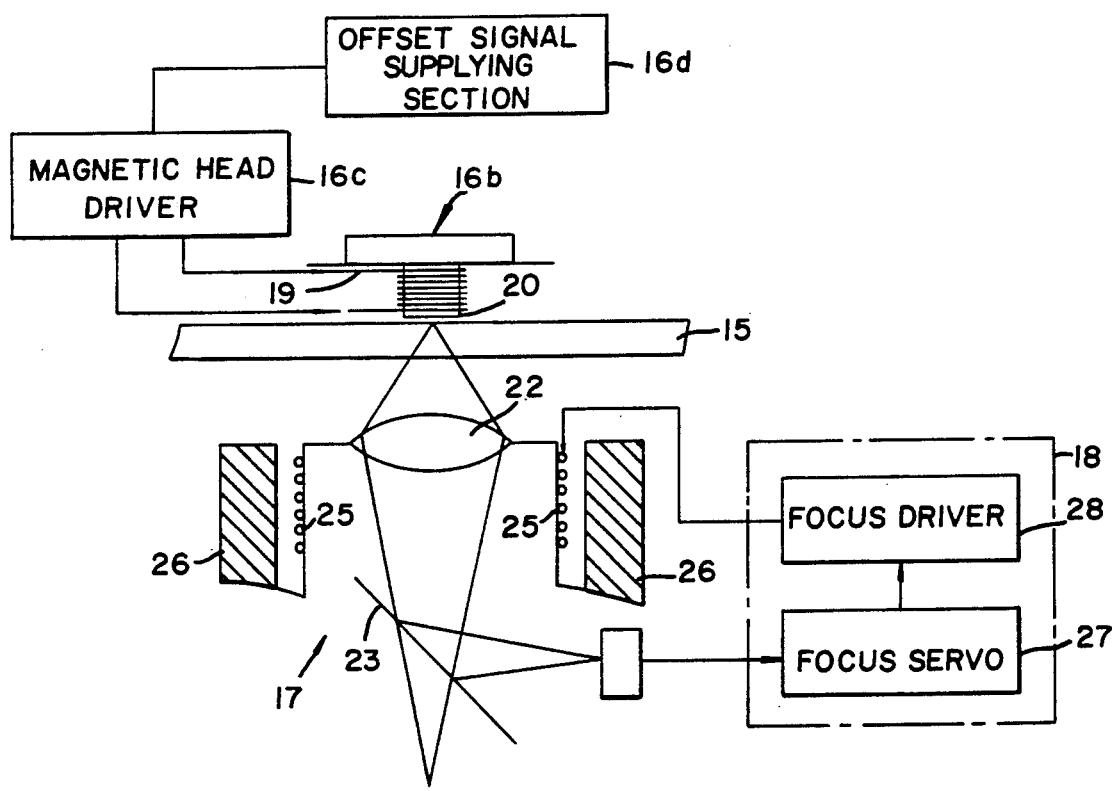
FIG. 4 is a schematic diagram of a third embodiment of the optical magnetic recording and reproducing system of the present invention.
Figure 5:
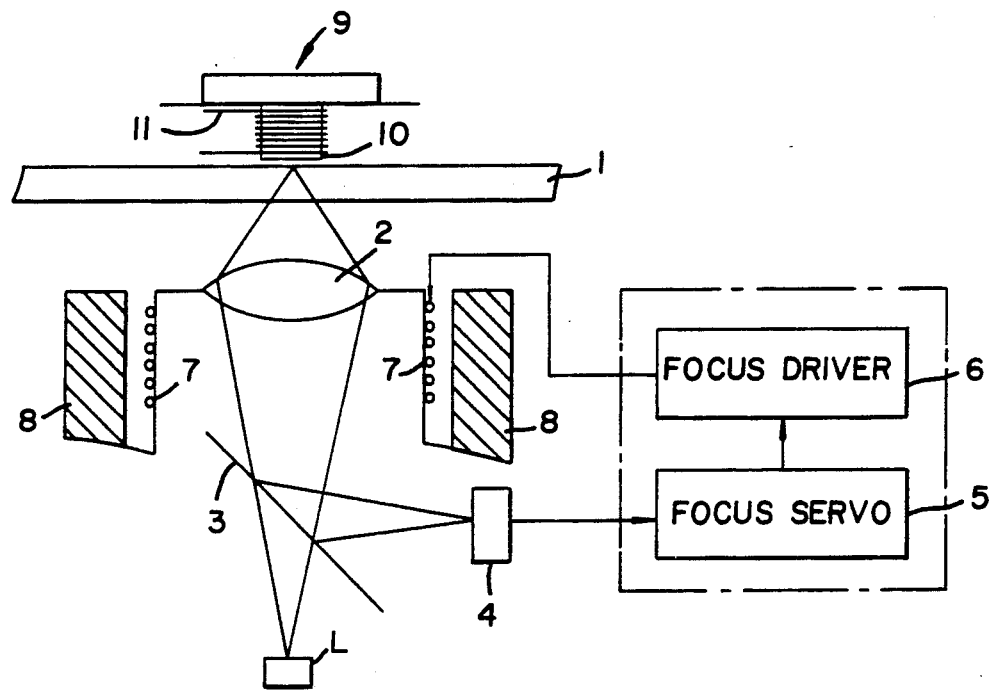
FIGS. 5 and 7 respectively show schematic diagrams of conventional optical magnetic recording and reproducing systems.
Figure 6:
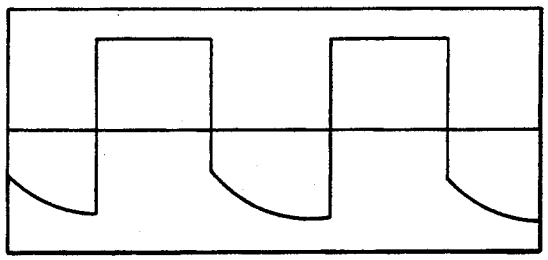
FIGS. 6 and 8 are graphs showing reproduction waveforms generated by the conventional system shown in FIGS. 5 and 7, respectively.
Figure 7:
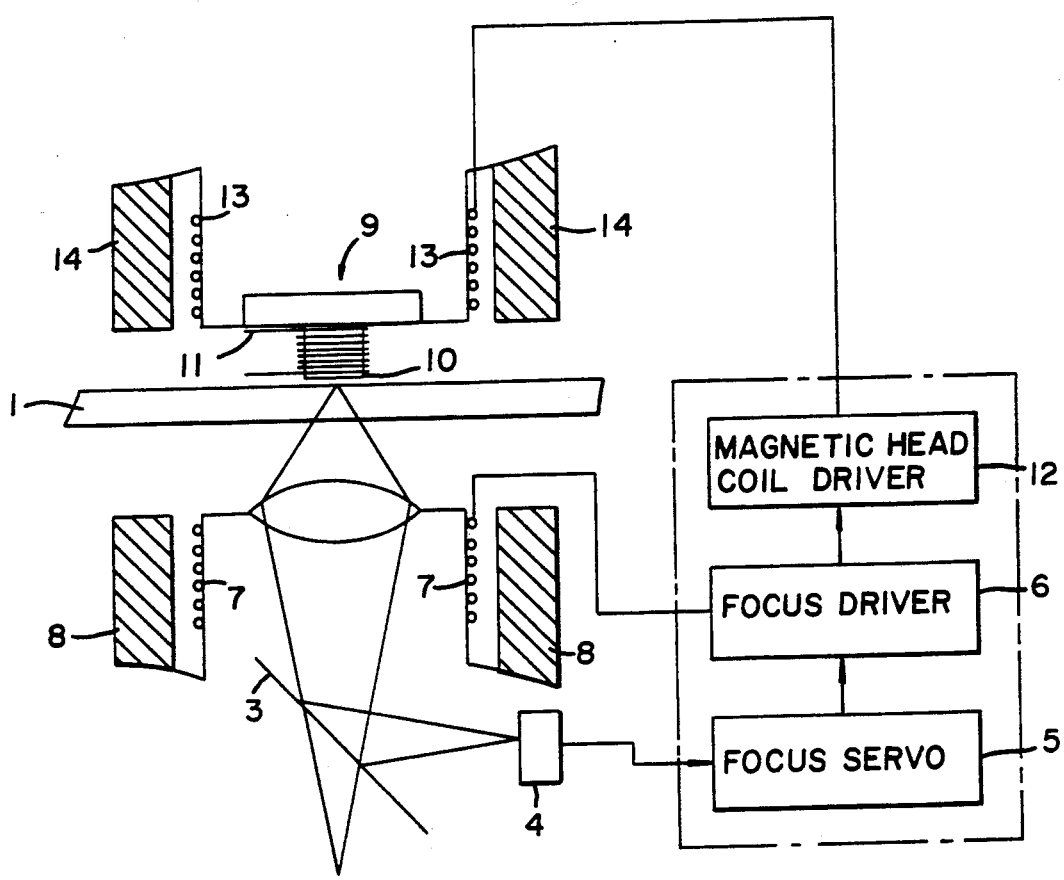
Figure 8:
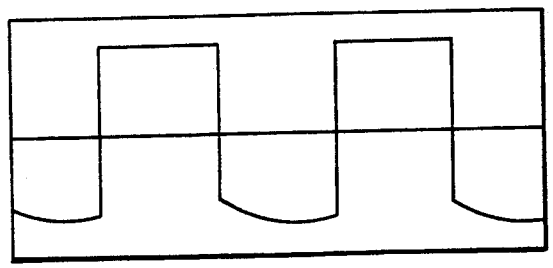

FIG. 4 shows the third embodiment of the present invention. The recording and reproducing system has a magnetic head 16b having the core 20 wound with the excitation coil 19. An offset signal supplying section 16d and a magnetic head driver 16c are provided in the system to cancel the vertical component of the resultant magnetic field which is caused by the leakage of the magnetic force. The offset signal supplying section 16d applies an offset signal, which is a direct current signal, to the excitation coil 19 through the driver 16c. The polarity of the offset signal is set to oppose the vertical component of the resultant magnetic force. The level of the offset signal is determined to generate a magnetic field having the same intensity as the vertical component.

In the third embodiment, the offset signal is applied to the excitation coil 19 when the electric signal is applied thereto. Hence the bias magnet provided in the previous embodiments can be obviated, so that a compact system can be obtained.

Although the magnetic head 16b of the third embodiment of the present invention is a fixed magnetic head, the embodiment may be modified so as to be applied to a system with a movable magnetic head.

Although, each of the above described embodiments of the present invention has been applied to a system where information is recorded by the magnetic modulation method, the present invention may be applied to a system using the light modulation recording method.

From the foregoing, it will be understood that the present invention provides an optical magnetic recording and reproducing system where the information is accurately recorded and reproduced so that the reliability of the system is ensured.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical magnetic recording and reproducing system for recording and reproducing information on a magneto-optical recording medium, comprising:

a disc comprising magneto-optical recording medium a magnetic head having a front side adjacent and facing said recording medium for applying a magnetic biasing field perpendicular to the recording medium;

an optical head means for irradiating a laser beam onto the recording medium when said magnetic biasing field is applied to said medium for recording information onto said medium;

reproducing means in said optical head means for detecting and reproducing said recorded information from said medium;

magnetic actuator means for axially moving said optical head means to focus said laser beam on said medium;

control unit means for controlling said magnetic actuator means for focusing the laser beam responsive to said detected information of said reproducing means; and magnetic field cancellation means provided at a back side, opposite said front side, of said magnetic head for producing a magnetic field to cancel a magnetic component of a leakage magnetic field leaked from the magnetic actuator means of the optical head means, which leakage magnetic field would otherwise affect said magnetic biasing field applied to the medium for recording information.

2. The system according to claim 1 wherein said magnetic component is a component vertical to the magneto-optical disk.

3. The system according to claim 1 wherein said magnetic field cancellation magnet means is attached to the magnetic head.

* * * * *

UNITED STATES PATENT AND TRADEMARK OFFICE
CERTIFICATE OF CORRECTION

PATENT NO. : 5,093,816
DATED : March 3, 1992
INVENTOR(S) : TANIGUCHI et al

It is certified that error appears in the above-identified patent and that said Letters Patent is hereby corrected as shown below:

On the cover page, item [73], change "Electric" to -- ELECTRONIC--.

Signed and Sealed this

Twenty-ninth Day of June, 1993

Attest:

MICHAEL K. KIRK

Attesting Officer

Acting Commissioner of Patents and Trademarks